United States Patent
Pinna et al.

(10) Patent No.: US 7,864,493 B2
(45) Date of Patent: Jan. 4, 2011

(54) ELECTRIC CIRCUIT WITH PROTECTION AGAINST OVERVOLTAGES

(75) Inventors: Carlo Pinna, Milan (IT); Germano Nicollini, Piacenza (IT)

(73) Assignee: St-Ericsson SA, Geneva (CH)

( * ) Notice: Subject to any disclaimer, the term of this patent is extended or adjusted under 35 U.S.C. 154(b) by 622 days.

(21) Appl. No.: 11/943,424

(22) Filed: Nov. 20, 2007

(65) Prior Publication Data
US 2008/0130181 A1 Jun. 5, 2008

(30) Foreign Application Priority Data
Nov. 22, 2006 (IT) .............................. MI06A2237

(51) Int. Cl.
*H02H 9/00* (2006.01)
(52) U.S. Cl. ...................................................... 361/56
(58) Field of Classification Search .................... 361/56
See application file for complete search history.

(56) References Cited

U.S. PATENT DOCUMENTS

| 6,400,546 | B1* | 6/2002 | Drapkin et al. ............. 361/111 |
| 7,532,054 | B2* | 5/2009 | Kanno et al. ................ 327/333 |
| 2009/0195292 | A1* | 8/2009 | Kanno et al. ................ 327/333 |

* cited by examiner

*Primary Examiner*—Ronald W Leja
(74) *Attorney, Agent, or Firm*—Lisa K. Jorgenson; Allen, Dyer, Doppelt, Milbrath & Gilchrist, P.A.

(57) ABSTRACT

An electric circuit includes a supply terminal to receive an outer supply voltage and a voltage regulator coupled to the supply terminal and to provide supply and resting voltages. A lock-out circuit is switchable between active and inactive states and receives the supply voltage at a supply node to generate, in the active state, an output voltage on a output terminal thereof. A protection circuit protects against electrostatic discharge, having at least one first diode coupled between the supply node and the output terminal. A cut-off electronic lock couples, in the inactive state, the supply node to the supply terminal by reverse biasing the at least one first diode to make a voltage of the output terminal float.

25 Claims, 3 Drawing Sheets

ELECTRIC CIRCUIT WITH PROTECTION AGAINST OVERVOLTAGES

FIELD OF THE INVENTION

The present invention relates to an electric circuit, supplied by a voltage regulator, which employs protection modes against electrostatic discharges.

BACKGROUND OF THE INVENTION

Some electric circuits such as the circuits employed in mobile telephones and made in semiconductor material can undergo damages caused by overvoltages deriving from electrostatic charges which can be generated by contacts (also simply by hand) with terminals of the same circuits which are accessible from the outside.

Prior approaches provide both the supply and the input/output terminals with electrostatic discharge devices, such as the ESD (Electrostatic Discharge) devices, which ensure the protection thereof against overvoltages.

SUMMARY OF THE INVENTION

The electric circuits to be protected can include, beside a voltage regulator, an amplifier provided with at least one output terminal for one voltage (for example, an audio signal) to be supplied to a using circuit. It is possible that the employment modes of the amplifier, or of another type of circuit, which supplies the voltage on the output terminal, provide for the latter to be brought to an inactive state—for example, either turned-off, or in stand-by—when the user circuit does not require its operation. In the inactive state, the amplifier may have its output terminal floating, not inducing it to any preset voltage values; however, in order that this happens, it is helpful if the circuit is supplied, that is, the voltage regulator is turned on.

On the contrary, if the voltage regulator is turned off, both the amplifier output devices and the devices employed for the protection do not allow for the output terminal to remain floating.

It shall be noted that it is possible to have applications in which it is important to be able to have an effectively floating output terminal, when both the circuit and the voltage regulator are in an inactive state.

In accordance with the present approach, an electric circuit includes a supply terminal to receive an outer supply voltage and a voltage regulator coupled to the supply terminal and to provide supply and resting voltages. A lock-out circuit is switchable between active and inactive states and receives the supply voltage at a supply node to generate, in the active state, an output voltage on a output terminal thereof. A protection circuit protects against electrostatic discharge, having at least one first diode coupled between the supply node and the output terminal. A cut-off electronic lock couples, in the inactive state, the supply node to the supply terminal by reverse biasing the at least one first diode to make a voltage of the output terminal float.

An apparatus embodiment includes the electronic circuit described above and a control device coupled to said output terminal to impose at least first and second voltage values to said output terminal, when said lock-out circuit of the electric circuit is in the inactive state. Moreover, a measurement device measures the at least one first and second voltage values on said output terminal.

BRIEF DESCRIPTION OF THE DRAWINGS

In order to better understand the invention and appreciate the advantages thereof, some embodiments thereof are described herein below, by way of non-limiting example, with reference to the appended drawings, in which.

DETAILED DESCRIPTION OF THE PREFERRED EMBODIMENTS

Figure 1:
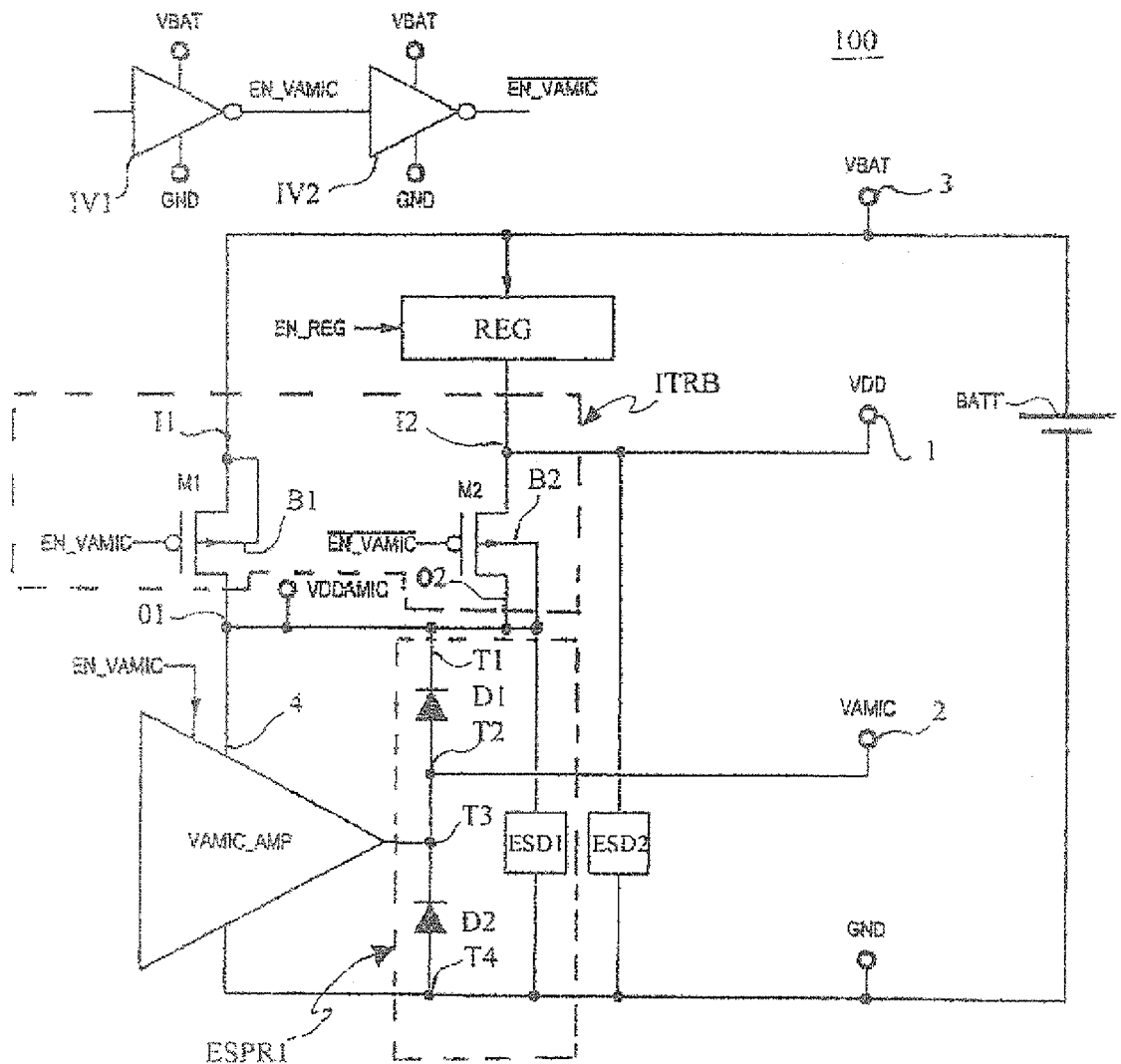
FIG. 1 shows a scheme of an example of an electric circuit, in accordance with the present invention, FIG. 2 schematically shows an example of an electrostatic discharge device which can be employed in a circuit, in accordance with the present invention.

FIG. 1 shows an electric circuit 100 comprising a voltage regulator REG, connected to a battery BATT (or, alternatively, to another type of generator) with lock-out circuit VAMIC_AMP provided with an output terminal 2 for a voltage to be supplied to a user circuit, not shown in FIG. 1.

The voltage regulator REG is connected to a first supply terminal 3, which supplies a first battery voltage VBAT derived from the battery BATT. The voltage regulator REG may take an active state, in which it supplies to a first terminal 1 thereof a supply voltage VDD, and an inactive state, in which it supplies to the first terminal 1 a resting voltage, that is the ground voltage. The switching between the active and the inactive states (in which the voltage regulator REG is turned off or in stand-by), and vice versa, is controlled by an enabling signal EN_REG.

Advantageously, the voltage regulator REG provides to the first terminal 1 the low noise supply voltage VDD (which represents a reference voltage for the lock-out circuit VAMIC_AMP) and, therefore, operates a rejection of the battery voltage VBAT noises.

The lock-out circuit VAMIC_AMP is also switchable between an active state and an inactive state, and it can be supplied through the supply voltage VDD in order to generate, in the active state, an output voltage VAMIC on its output terminal 2. As it will be clarified herein below, the circuit 100 in the inactive state is such as to make the output terminal 2 having an high impedance or, correspondently, to have the output terminal 2 "floating", thereby making that the same lock-out circuit does not impose voltage values to such output terminal.

The lock-out circuit VAMIC_AMP is provided with a respective input terminal 4 connected to a supply node VDDAMIC on which the supply voltage VDD is provided, as will be clarified herein below.

The lock-out circuit VAMIC_AMP, for example, is a signal amplifier and can be, in particular and without limitation, an amplifier which can be used to provide a voltage signal VAMIC to a microphone (not shown) such as that of a cellular telephone.

The lock-out circuit VAMIC_AMP has an activation terminal to receive a first control signal EN_VAMIC adapted to take an activation value (for example, high logic value) and an inactivation value (for example, low logic value). In accordance with the particular example of FIG. 1, such first control signal EN_VAMIC is generated by a first inverter IV1 so that the activation value may be equal to the battery voltage VBAT, and the inactivation value may be equal to the ground voltage GND.

The possibility to bring both the voltage regulator REG and the lock-out circuit VAMIC_AMP in an inactive state is particularly advantageous, since it allows for an economy in the power drawn from the battery BATT, when the user circuit is not operative.

The electric circuit 100 is further provided with an electronic circuit ESPR1 for the protection of the output terminal 2 against electrostatic overvoltages. Such first protection circuit ESPR1 allows to discharge to a ground terminal GND the electrostatic charges which may be present at the output terminal 2, for example, charges brought to the output terminal 2 through a contact with a clamp of a user circuit, or a direct hand contact by a user.

According to an exemplary embodiment, the protection circuit ESPR1 comprises at least one first diode device and, in particular, it is provided with a first diode D1 and a second diode D2. In greater detail, the first diode D1 has a first terminal T1 connected to the supply node VDDAMIC, and a second terminal T2 connected to the output terminal 2. Advantageously, the terminal T1 of the first diode D1 is a negative terminal (that is of the N type) of the same diode, while the second terminal T2 is the positive terminal (of the P type). The second diode D2 has a respective first terminal T3 (of the N type) connected to the output terminal 2 and a respective second terminal T4 (of the P type) connected to the ground terminal GND.

Furthermore, the protection circuit ESPR1 comprises a first electrostatic discharge device ESD1, located, according to the example, in parallel to the D1 and D2 diodes array and, thus, connected to the first terminal T1 of the first diode D1, common to the supply node VDDAMIC, and the ground terminal GND. The first electrostatic discharge device ESD1, is to represent, under standard conditions, (that is, substantially in the absence of current due to electrostatic charge), an open circuit, and to constitute a connection between the first terminal T1 of the diode D1 and the ground terminal GND, when a current amount due to the electrostatic charge at the first terminal T1 above a preset value is detected, allowing to discharge the current to the ground. A particular embodiment of the electrostatic discharge device ESD1 will be described below with reference to FIG. 2.

The electric circuit 100 is also provided with a cut-off electronic lock ITRB to connect, in the inactive state, the supply node VDDAMIC—and thus the input terminal 4—to the first supply terminal 3, by reverse biasing the first diode D1. By reverse biasing the first diode D1, the output terminal 2 is isolated from the supply node VDDAMIC, thus making it floating, that is, inducing such output terminal 2 to have a high impedance.

Furthermore, according to the example, the cut-off electronic lock ITRB is to disconnect, in the active state, the supply node VDDAMIC from the first supply terminal 3.

Advantageously, the cut-off electronic lock ITRB is to connect/disconnect (in the active and inactive states, respectively) the first terminal 1 of the voltage regulator REG from the supply node VDDAMIC, and therefore from the input terminal for the supply 4 of the lock-out circuit VAMIC_AMP. Preferably, the cut-off electronic lock ITRB comprises a first switch M1 having a first input I1 connected to the first supply terminal 3 (where the battery voltage VBAT is located), and a first output O1 connected to the supply node VDDAMIC of the lock-out circuit VAMIC_AMP.

The first switch M1 is controlled to be open (by inhibiting the conduction between I1 and O1) during the active state, and to be closed (conduction enabled between I1 and O1) during the inactive state, in order to substantially carry the battery voltage VBAT to the supply node VDDAMIC. The first switch M1 has a respective control terminal to receive, for example, the above-mentioned signal EN_VAMIC as the control signal, resulting in a suitable synchronization with the transitions from the active to the passive states of the regulator REG and the lock-out circuit VAMIC_AMP.

In particular, the cut-off electronic lock ITRB comprises a second switch M2 having a second input I2 connected to the first terminal 1, and a second output O2 connected to the supply node VDDAMIC of the lock-out circuit VAMIC_AMP. The second switch M2 is controlled to be closed (that is, it enables the conduction between I2 and O2) during the active state to carry the supply voltage VDD to the supply node VDDAMIC. The second switch M2 is controlled to be open (by inhibiting the conduction between I2 and O2) when the regulator REG and the lock-out circuit VAMIC_AMP are in the inactive state.

The second switch M2 has a respective control terminal to receive a second control signal such as, in accordance with the example, the denied signal of EN_VAMIC, resulting in a suitable synchronization with the transitions of the regulator REG and the lock-out circuit VAMIC_AMP from the active to the passive states, and vice versa. In particular, the denied signal of EN_VAMIC is generated by a second inverter IV2 connected in output to the first inverter IV1, and such as to take the voltages VBAT and GND.

According to a preferred exemplary embodiment, at least one of the switches M1 and M2 includes a respective transistor MOSFET (Metal Oxide Semiconductor Field Effect Transistor) or, in short, MOS. In particular, taking into account that the circuit 100 can be made (for example) by the semiconductor integrated technology and, preferably, by the MOS technology, the first and the second switches M1 and M2 are preferably P-channel MOS transistors. The control signals EN_VAMIC and the denied signal thereof are applied to respective gate terminals of the two MOS transistors M1 and M2.

It shall be noted that, according to the particular embodiment described, the electric circuit 100 is such that the battery voltage VBAT is the voltage value that the nodes and terminals of the same circuit can reach. Advantageously, to ensure a proper functioning of the first MOS transistor M1, this has (as schematically outlined in FIG. 1) its own body or substrate terminal B1 connected to the input I1, that is connected to the first supply terminal 3 where the battery voltage VBAT is available.

The second MOS transistor M2 has its own body terminal B2 connected to the supply node VDDAMIC, where the battery voltage VBAT is available, when the lock-out circuit VAMIC_AMP is in the inactive state.

Advantageously, the electric circuit 100 comprises a second electrostatic discharge device ESD2, which can be made similarly to the first device ESD1, connected between the first terminal 1 and the ground terminal GND in order to discharge to the ground the electrostatic charge which is present at the first terminal 1. The electrostatic discharge device ESD2, or another equivalent protection form, allows protecting the supply node VDDAMIC (connectable to the first terminal 1) and the ground terminal GND.

Figure 2:
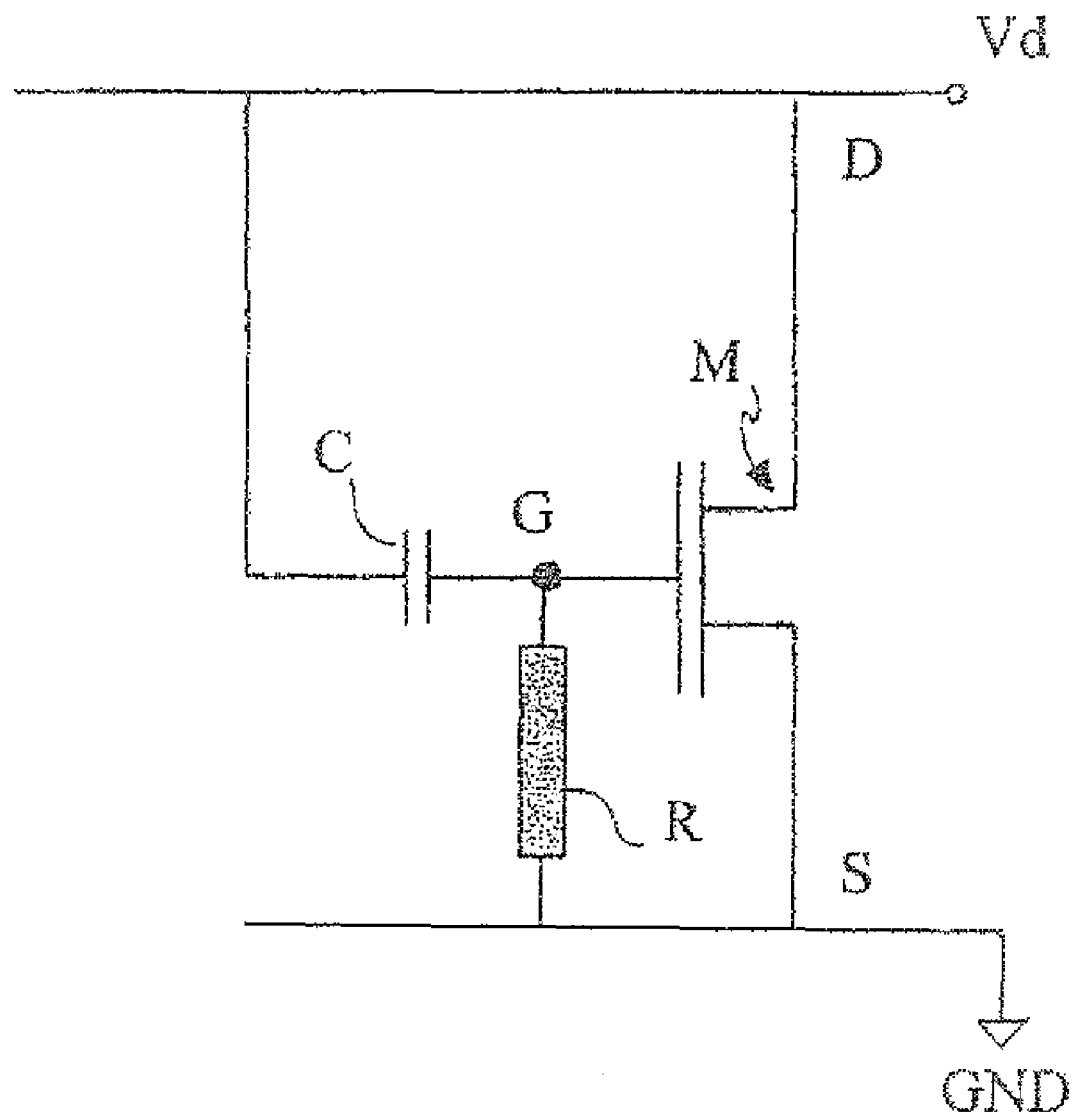

FIG. 2 schematically shows a particular embodiment of an electrostatic discharge device ESD (which can be made in MOS technology), the basic architecture of which can be employed for the implementation of the first and the second electrostatic discharge devices ESD1 and ESD2.

The electrostatic discharge device ESD comprises a transistor, for example, a MOS transistor M (in particular, of the N-channel type), having a source terminal S connected to the ground terminal GND, a drain terminal D connected to a supply terminal Vd, and a gate terminal G connected to a terminal of a resistor X, having another terminal connected to the ground terminal GND.

Furthermore, the electrostatic discharge device ESD is provided with a capacitor C connected between the supply terminal Vd and the gate terminal G.

In a standard operative condition, a preset voltage Vd is applied, and the resistor R brings the gate voltage G of the transistor M to the ground value. In this circumstance, the capacitor C remains charged between the ground and the Vd voltages, and the transistor M is inactive. This condition may be maintained for some degree of variations of the voltage Vd.

In the case a rapid variation of the voltage Vd occurs (as happens for electrostatic discharges) the capacitor C raises the gate terminal G voltage to the activation of the MOS transistor M, which closes, thus allowing a discharging of the charge inputted into the device ESD to the ground terminal GND. Once the discharge is run down, the voltage is lowered at the gate terminal G, and the transistor M opens again.

On the basis of FIG. 2, those of ordinary skill in the art will be easily able to design electrostatic discharge devices which are suitable also for currents associated to electrostatic charges having a sign opposite to the one examined in the previous example.

With reference to the electric circuit 100 functioning, a condition is to be taken into account in which the voltage regulator REG and the lock-out circuit VAMIC_AMP are in the active state (for example, the first control signal EN_VAMIC and the enabling signal EN-REG are equal to VBAT).

In such condition, the first transistor M1 is open, while the second transistor M2 is closed, thus allowing an electric connection between the first terminal 1, on which the supply voltage VDD is available, and the supply node VDDAMIC. The lock-out circuit VAMIC_AMP, which substantially receives the supply voltage VDD—suitably stabilized by the regulator REG—at the terminal 4 thereof, operates by supplying the output voltage VAMIC on the output terminal 2. Such output voltage VAMIC will be able to be used by a user circuit in the modes provided for by the particular application. The lock-out circuit VAMIC_AMP is sized so as the voltage VAMIC is able to take values within a specific range.

In the case where the user circuit is not operative anymore, and does not require the voltage VAMIC, both the lock-out circuit VAMIC_AMP and the voltage regulator REG are brought to the inactive state by the first control signal EN_VAMIC (which takes the GND value), and by the enabling signal EN_REG (which takes the GND value), so as to result in an energy saving. The voltage regulator REG brings the first terminal 1 to the ground voltage GND.

The first transistor M1 switches from the open to the closed state, making the battery voltage VBAT (the positive voltage, according to the example) to be supplied at the supply node VDDAMIC, thereby ensuring that the first diode D1 is inversely biased, so as to avoid an electric connection between the output terminal 2 and the supply node VDDAMIC. In such condition, the output terminal 2 is isolated from the supply node VDDAMIC and the first terminal 3; therefore, it is floating, representing a high-impedance node.

Furthermore, the second transistor M2 switches from the closed to the open states, thus interrupting the electric connection between the first terminal 1 and the supply node VDDAMIC.

It shall be noted that the switching of the second transistor M2 to the open state prevents the ground voltage GND which is present at the first terminal 1 from causing an activation of the first diode D1 (by lowering the voltage of its N-type terminal T1), putting in electric connection the first terminal 1 and the output terminal 2. If, in the inactive state, the electric connection between the first terminal 1 and the output terminal 2 would occur, on the latter the voltage taken by the first terminal 1 may be imposed.

Furthermore, the fact that the first switch M1 carries the supply node VDDAMIC to the battery voltage VBAT induces a possible undesired current which passes through the second switch M2 in the open state to not be able to cause the direct biasing of the first diode D3.

With regard to the behaviour toward electrostatic discharges, the electric circuit 100 is to be considered. In the case where an overvoltage at the output terminal 2 is inputted, for example, such to introduce a positive electric charge, this raises the output terminal 2 and the second terminal T2 potentials of the first diode D1, thus causing the direct biasing thereof. In this way, the positive charge introduced by the output terminal 2 reaches the first terminal T1 of the first diode D1, thus activating the first discharge device ESD1 which allows it to flow out towards the ground terminal GND. In the case of a negative charge inserted by the output terminal 2, this induces a direct biasing of the second diode D2, so as to allow to the same charge to be discharged towards the ground GND.

In the case where a charge is inputted by the first terminal 1, the charge will be able to be readily discharged towards the ground terminal GND by the second electrostatic discharge device ESD2. In particular applications, it is useful that the output terminal 2 remains floating in the inactive state.

Figure 3:
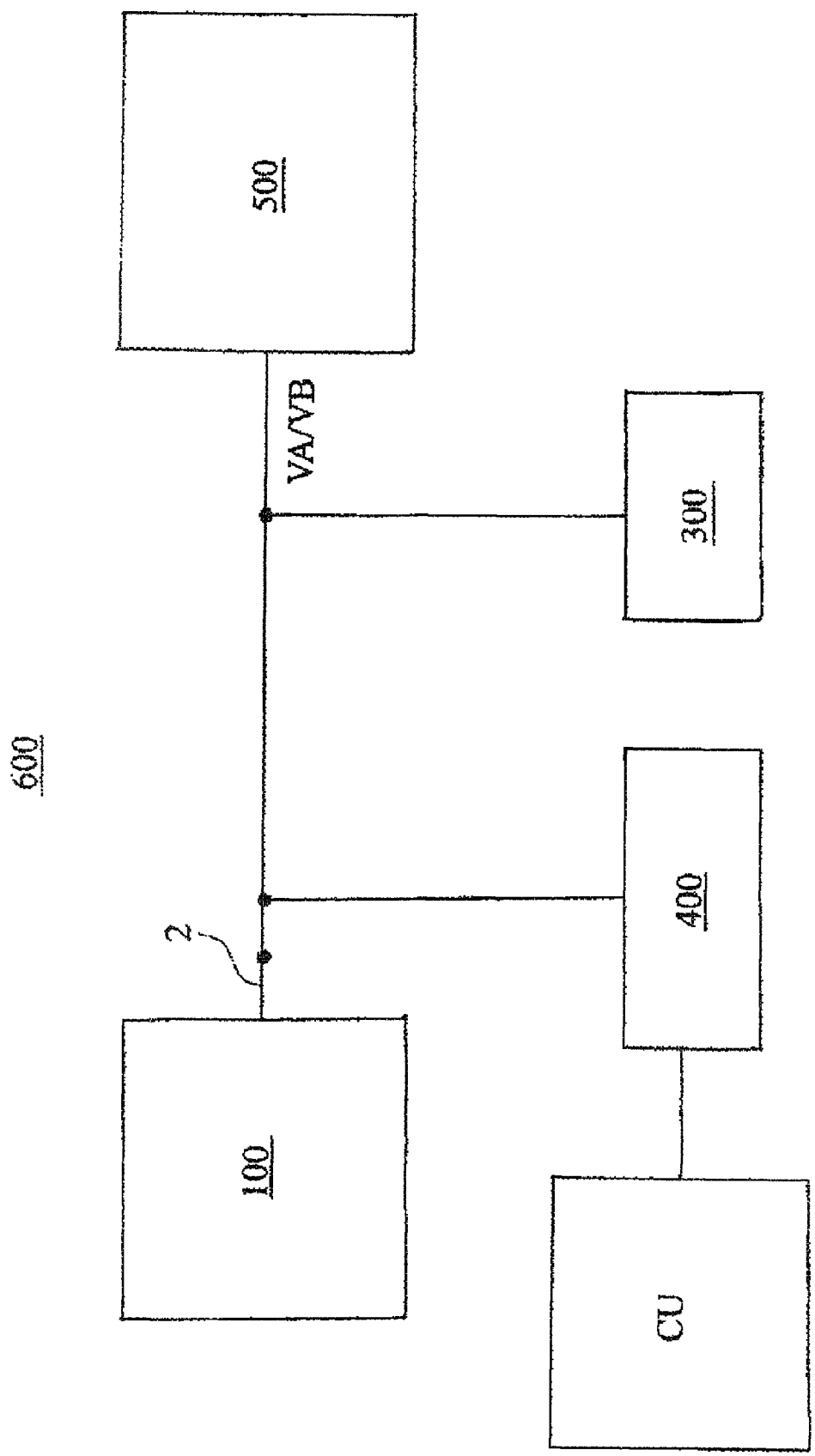
FIG. 3 shows an apparatus employing the electric circuit, in accordance with the present invention.

To this regard, with reference to FIG. 3, an apparatus 600 is shown (for example, a mobile telephone) comprising the electric circuit 100 described above, a control device 300, a measurement device 400, and a user circuit 500, all connected to the electric circuit 100 output terminal 2. Furthermore, the apparatus 600 comprises a checking device CU connected to the measurement device 400.

When the lock-out circuit VAMIC_AMP (FIG. 1) is activated, it supplies on the output terminal 2 the voltage VAMIC which is used by the user circuit 500, for example a microphone connected to an earpiece which can be coupled to the mobile telephone. When the lock-out circuit VAMIC_AMP is inactive and the output terminal 2 is left floating, such terminal is free to take the voltage imposed by the control circuit 300.

For example, the control circuit 300 can supply a voltage having a first value VA, and indicative of a first control imparted by a user of the apparatus 600. Alternatively, the control circuit 300 can supply a second voltage value VB indicative of another control imparted by the user through the control circuit 300.

The measurement device 400 may be able to measure the voltage applied to the output terminal 2 by the control device 300 so as to evaluate the type of control imparted by the user. On the basis of the type of control recognized by the measurement device, the checking device CU (for example, a microprocessor) may be able to generate checking signals of the apparatus 600 such as, for example, the enabling signal EN_REG and the control signal EN_VAMIC, so as to bring the electric circuit 100 back in the active state.

The teachings of the present invention are particularly advantageous, since they allow combining the protection of the output terminal 2 against electrostatic discharges with the possibility to let the same output terminal floating, when the lock-out circuit VAMIC_AMP is in the inactive state.

This allows connecting not only the user circuit, but also other circuits intended to function to the same output terminal when the lock-out circuit VAAMIC_AMP is inactive.

It shall be noted that the employment of an electrostatic discharge device, such as the first device ESD1, connected between inner nodes of the electric circuit 100 and not connected, as typically occurs, between the supply terminals and a ground terminal, constitutes an innovative use of such discharge device.

The protection against electrostatic discharges can be advantageously carried out also for the first supply terminal 1 through the second discharge device ESD2. Furthermore, the preferred use of switches M1 and M2 of the P-MOS type with the relative body terminal connected to the node for which the maximum electric voltage is applied ensures a proper biasing of these devices.

That which is claimed is:

1. An electric circuit comprising:
   a supply terminal to receive an external supply voltage;
   a voltage regulator coupled to said supply terminal and to provide supply and resting voltages;
   a lock-out circuit switchable between active and inactive states and to receive the supply voltage at a supply node to generate, in the active state, an output voltage on a output terminal thereof;
   a protection circuit to protect against electrostatic discharge, comprising at least one first diode coupled between said supply node and said output terminal; and
   a cut-off electronic lock to couple, in the inactive state, said supply node to said supply terminal by reverse biasing said at least one first diode to make a voltage of said output terminal float.

2. The circuit according to claim 1, wherein said voltage regulator is to provide the supply voltage when said lock-out circuit is in the active state and to provide the resting voltage when said lock-out circuit is in the inactive state; and wherein said cut-off electronic lock is also to:
   couple a first terminal of said voltage regulator, on which the supply voltage is available, to said supply node, when said lock-out circuit is in the active state;
   disconnect said first terminal of said voltage regulator, on which the resting voltage is available, from said supply node of said lock-out circuit, when said lock-out circuit is in the inactive state; and
   disconnect said supply node from said supply terminal when said lock-out circuit is in the active state.

3. The circuit according to claim 2, wherein said cut-off electronic lock comprises a first switch having a first input coupled to said supply terminal, and a first output coupled to said supply node of said lock-out circuit; said first switch being open when said lock-out circuit is in the active state and being closed when said lock-out circuit is in the inactive state, to carry the external supply voltage to said supply node.

4. The circuit according to claim 3, wherein said cut-off electronic lock further comprises a second switch having a second input coupled to said first terminal and a second output coupled to said supply node of said lock-out circuit; said second switch being closed when said lock-out circuit is in the active state to carry the supply voltage to said supply node, and being open when said lock-out circuit is in the inactive state.

5. The circuit according to claim 4, wherein said first and second switches include respective MOS devices of a P-type; a first substrate of said MOS device of said first switch being coupled to said first input, and a second substrate of said MOS device of said second switch being coupled to said supply node.

6. The circuit according to claim 4, wherein said second switch has a control terminal to receive a second denied control signal of said first control signal.

7. The circuit according to claim 3, wherein said lock-out circuit and said first switch each have respective activation terminals to receive a first control signal adapted to take an activation and a inactivation values.

8. The circuit according to claim 7, wherein said activation value is equal to the external supply voltage, and said inactivation value is equal to a ground voltage.

9. The circuit according to claim 1, wherein said protection circuit is to protect by discharging toward a ground terminal a current associated with electrostatic charge inputted to said output terminal; and
wherein said at least one first diode is forward biased in a presence of the current associated with electrostatic charge inputted to said output terminal.

10. The circuit according to claim 1, wherein said at least one first diode has a first diode terminal coupled to said supply node and a second diode terminal coupled to said output terminal.

11. The circuit according to claim 10, wherein said first diode terminal is of an N-type.

12. The circuit according to claim 10, wherein said protection circuit further comprises an electrostatic discharge device coupled to the first diode terminal, common to said supply node, and to a ground terminal; said at least one first diode, when said lock-out circuit is in the inactive state, being biased by an electrostatic charge which is present at said output terminal to allow to the electrostatic charge to be discharged to said ground terminal through said electrostatic discharge device.

13. The circuit according to claim 12, further comprising a second electrostatic discharge device coupled between said first terminal and a ground terminal to discharge to ground an electrostatic charge which is present at said first terminal.

14. The circuit according to claim 13, wherein each of said electrostatic discharge devices includes a capacitor, a transistor, and a resistor; said transistor having a control terminal coupled to said capacitor so that an electrostatic charge which arrives to said capacitor brings said transistor to conduction to allow it to discharge toward said ground terminal.

15. The circuit according to claim 10, wherein said protection circuit further comprises a second diode having a third diode terminal coupled to said second diode terminal, and a fourth diode terminal coupled to a ground terminal.

16. The circuit according to claim 1, wherein said cut-off electronic lock includes at least one MOS device.

17. The circuit according to claim 1, wherein said at least one MOS transistor is of the P type.

18. The circuit according to the claim 1, wherein said voltage regulator is also to carry out a rejection of noise of the external supply voltage.

19. An electronic apparatus comprising:
   an electric circuit comprising a supply terminal to receive an external supply voltage,
   a voltage regulator coupled to said supply terminal and to provide supply and resting voltages,
   a lock-out circuit switchable between active and inactive states and to receive the supply voltage at a supply node to generate, in the active state, an output voltage on an output terminal thereof,
   a protection circuit to protect against electrostatic discharge, comprising at least one first diode coupled between said supply node and said output terminal, and
   a cut-off electronic lock to couple, in the inactive state, said supply node to said supply terminal by reverse biasing said at least one first diode to make said output terminal float;

a control device coupled to said output terminal to impose at least first and second voltage values to said output terminal, when said lock-out circuit of the electric circuit is in the inactive state; and a measurement device taking measurement of the at least one first and second voltage values on said output terminal.

20. The electric apparatus according to claim 19, further comprising:

a user circuit coupled to said output terminal to receive the output voltage;

a checking device coupled to said measurement device to generate control signals corresponding to a measurement of the at least first and second voltage values taken by said measurement device.

21. The apparatus according to claim 19, wherein the apparatus is configured to define a mobile telephone.

22. The apparatus according to claim 21, further comprising an earpiece; and wherein said user circuit comprises a microphone coupled to said earpiece.

23. A method of protecting an electric circuit against electrostatic discharges, the electric circuit comprising a supply terminal to receive an external supply voltage, a voltage regulator coupled to the supply terminal and to provide supply and resting voltages, a lock-out circuit switchable between active and inactive states and to receive the supply voltage at a supply node to generate, in the active state, an output voltage on a output terminal thereof, and a protection circuit to protect against electrostatic discharge including at least one first diode coupled between the supply node and the output terminal, the method comprising:

coupling, in the inactive state, the supply node to the supply terminal by reverse biasing the at least one first diode to make the output terminal float.

24. The method according to claim 23, wherein the voltage regulator is to provide the supply voltage when the lock-out circuit is in the active state and to provide the resting voltage when the lock-out circuit is in the inactive state; and further comprising:

coupling a first terminal of the voltage regulator, on which the supply voltage is available, to the supply node, when the lock-out circuit is in the active state;

disconnecting a first terminal of the voltage regulator, on which the resting voltage is available, from the supply node of the lock-out circuit, when the lock-out circuit is in the inactive state; and disconnecting the supply node from the supply terminal when the lock-out circuit is in the active state.

25. The method according to claim 23, further comprising discharging toward a ground terminal a current associated with electrostatic charges inputted to the output terminal; and forward biasing the at least one first diode in a presence of the current associated with electrostatic charges inputted to the output terminal.

* * * * *

UNITED STATES PATENT AND TRADEMARK OFFICE
CERTIFICATE OF CORRECTION

| | |
|---|---|
| PATENT NO. | : 7,864,493 B2 |
| APPLICATION NO. | : 11/943424 |
| DATED | : January 4, 2011 |
| INVENTOR(S) | : Pinna et al. |

It is certified that error appears in the above-identified patent and that said Letters Patent is hereby corrected as shown below:

Column 4, Line 66     Delete: "resistor X"
                      Insert: --resistor R--

Column 6, Line 8      Delete: "D3"
                      Insert: --D1--

Column 8, Line 26     Delete: "allow to"
                      Insert: --allow--

Signed and Sealed this
Nineteenth Day of July, 2011

David J. Kappos
*Director of the United States Patent and Trademark Office*